United States Patent [19]

Ribberfors et al.

[11] Patent Number: 4,894,543
[45] Date of Patent: Jan. 16, 1990

[54] METHOD FOR MEASURING X-RAYS OR GAMMA RADIATION AND DEVICE FOR THIS

[76] Inventors: Roland Ribberfors, Allmogegatan 92, Linköping, Sweden, S-583 30; Georg Matscheko, Drottninggatan 41, Linköping, Sweden, S-582 27

[21] Appl. No.: 163,545
[22] Filed: Mar. 3, 1988
[51] Int. Cl.$^4$ .............................................. G01T 1/16
[52] U.S. Cl. ............................ 250/336.1; 250/370.06
[58] Field of Search .................. 250/336.1, 370.06; 378/207

[56] References Cited

FOREIGN PATENT DOCUMENTS 0837209 3/1972 U.S.S.R. ........................ 250/336.1

OTHER PUBLICATIONS

Rauch et al., "Absolute Kilovolt Calibr. of a Diagnostic X-Ray Generator" Medical Physics, vol. 2, No. 1 (Jan.-/Feb. 1975).

Primary Examiner—Janice A. Howell
Assistant Examiner—Richard Hanig
Attorney, Agent, or Firm—Fitch, Even, Tabin & Flannery

[57] ABSTRACT

According to the invention x-rays, gamma radiation is measured by means of the Compton effect utilizing scattering towards a long and narrow filament of polyethylene, lucite or another material having a low average atomic number. The radiation scattered from the filament (4) is measured by a detector (8) and the radiation to and from, respectively, the filament is shielded by collimators (2,4, 6 and 7). the detector (8) is connected to a multichannel analyzer which, in turn, is connected to a computer performing a reconstruction of the primary radiation from the measured spectrum. The measuring method is practical in use and very accurate.

14 Claims, 2 Drawing Sheets

METHOD FOR MEASURING X-RAYS OR GAMMA RADIATION AND DEVICE FOR THIS

BACKGROUND OF THE INVENTION

Clinical use of quantitative X-ray methods such as the determination of bone mineral content or tissue density for dose planning purposes demand a knowledge of the energy distribution of the x-rays. Spectrometry with germanium detectors requires counting rats of about 50 000 pulses/second or less in order to avoid overlapping pulses (pile ups). With the high fluence from clinical x-ray tubes appropriate counting rates is attained only if the distance between the x-ray source and the detector are several meters and the collimators have diameters that are as small as 0.025–0.5 mm.

This direct measuring method cannot be used in practice in clinical x-ray laboratories due to space limitations. FIG. 2, the upper continuous line, shows a spectrum measured directly.

Due to the practical difficulties of the direct measuring method it is only used to a small extent. Moreover, there will be problems with the alignment of the detector because it is easy to measure, by mistake, beside or on the edge of the x-ray focus which, of course, is not intended.

An extremely efficient method for reduction of the pulse rate is utilizing Compton scattering, i.e., the radiation is scattered of the electrons in a material. However, when the radiation is scattered in this way energy is lost to the electrons and as a result of this the original spectrum will be distorted, the consequence being, in turn, that this is no longer representative. Accordingly, Compton scattering has not been utilized so far as a basis of spectrometry. FIG. 2, the lower curve, shows a Compton scattered spectrum.

SUMMARY OF THE INVENTION

However, we have developed this method further which has previously been utilized, i.e., by Yaffe et al. to get a very good energy resolution and to make the method applicable in clinical connections. By a special choice of scatterer (a long and narrow filament or a long and narrow rod) a very well-defined scattering angle is obtained optimizing the geometrical energy resolution. Moreover, as distinguished from what has been done in previous embodiments, correct scattering algorithms are used. We have, i.e., taken into consideration that the incoming x-ray radiation is polyenergetic.

Against the background of the above needs and set of problems it is the object of the invention to enable spectrometry for high energy electromagnetic radiation by means of Compton scattering. This is done by utilizing as a scattering element a long and narrow filament or a long and narrow rod. Of course a distortion of the measured spectrum is obtained also here but it will be possible by the very use of such a rod or filament to reconstruct by calculations the original spectrum with a very good accuracy. Firstly, by using a filament or rod a very well-defined scattering angle is obtained. Secondly, the scattering from the surrounding medium (air) is minimized as it is measured from the volume determined by the intersecting beam paths of the beam incident from the source and the beam path of the detector. Moreover, by using a very long and narrow filament or a very long and narrow rod having a circular cross-sectional area, a possibility of varying direction is obtained as the scattering volume does not vary with the scattering angle.

DETAILED DESCRIPTION OF THE PREFERRED EMBODIMENT

By using in a suitable further development of the invention a material for the rod or filament having a low average atomic number, the Doppler effect is reduced which, in turn, brings a better reproduction of adjacent peaks in the spectrum. As suitable materials; polyethylene, Lucite or another material having a low average atomic number is suggested. The reconstruction of the primary spectrum from the measured spectrum is carried out by means of the following formulas which have recently been produced by the inventors.

As the physics lying behind is complicated we will only give the final expressions.

$$\Phi_{0,h\nu}(h\nu_0) = \tag{E1}$$

$$N_{h\nu}(h\nu_c)/(N_e 1/2 r_0^2 A(h\nu_0, h\nu_c)(\nu_c/\nu_0 + \nu_0/\nu_c - \sin^2\theta)\overline{\Delta\Omega})$$

In the equation (E1) $N_{h\nu}(h\nu_c)d(h\nu_c)$ is the number of photons registered by the detector between the energies $h\nu_c$ and $h\nu_c+d(h\nu_c)$ after correction for the distortion of the detector itself (detector response).

$N_e$ = the total number of electrons in the scatterer
$r_0$ = the standard electron radius = $2.83 * 10^{-15}$ m $$A(h\nu_0, h\nu_c) = \tag{E2}$$

$$\exp(-1(a)\mu_a(h\nu_c) - (8r/3\pi)(\mu_s(h\nu_0) + \mu_s(h\nu_c)))$$

gives the radiation damping in the scatterer and in the air (attenuation).

$1(a)$ = the distance in air between the scatterer and the detector.
$u_a$ = the attenuation coefficient of air.
$u_s$ = the attenuation coefficient of the scatterer.
$r$ = the radius of the circular and filamentous scatterer
$h\nu_c$ = the energy of the Compton-scattered radiation
$h\nu_0$ = the incoming energy resulting from the relation $$h\nu_c = mc^2 h\nu_0/(mc^2 + h\nu_0(1 - \cos\theta)) \tag{E3}$$

The scattering angle $\theta$ is found in the equations (E1) and (E3). The self energy of the electron = $mc^2$.

In equation (E1) $\Delta\Omega$ is the solid angle element subtend by the detector from a point in the scatterer on an average.

In equation (E1) $\Phi_{0,h\nu}(h\nu_0)$ represents the approximately reconstructed radiation intensity (before scattering). This corresponds to FIG. 2, dotted line, except the peaks. We also reconstruct the peaks and must then work with a complicated expression containing numerical derivatives of $\Phi_{0,h\nu}(h\nu_0)$, equation (E1).

The average kinetic energy T of the electrons in the scatterer is also included. The expression reads:

$$\Phi_{1,h\nu}(h\nu_0) = \Phi_{0,h\nu}(h\nu_0) - \quad (E4)$$

$$(T/3\ mc^2)\ (\nu_0/\nu_c)^2\{(d^2\Phi_{0,h\nu}(h\nu_0)/d\ (h\nu_0)^2((h\nu_0)^2 +$$

$$(h\nu_c)^2 - 2h\nu_0 h\nu_c\cos\theta) + 2(d\Phi_{0,h\nu}(h\nu_0)/d(h\nu_0))(h\nu_0 - h\nu_c\cos\theta)\}$$

Figure 2:
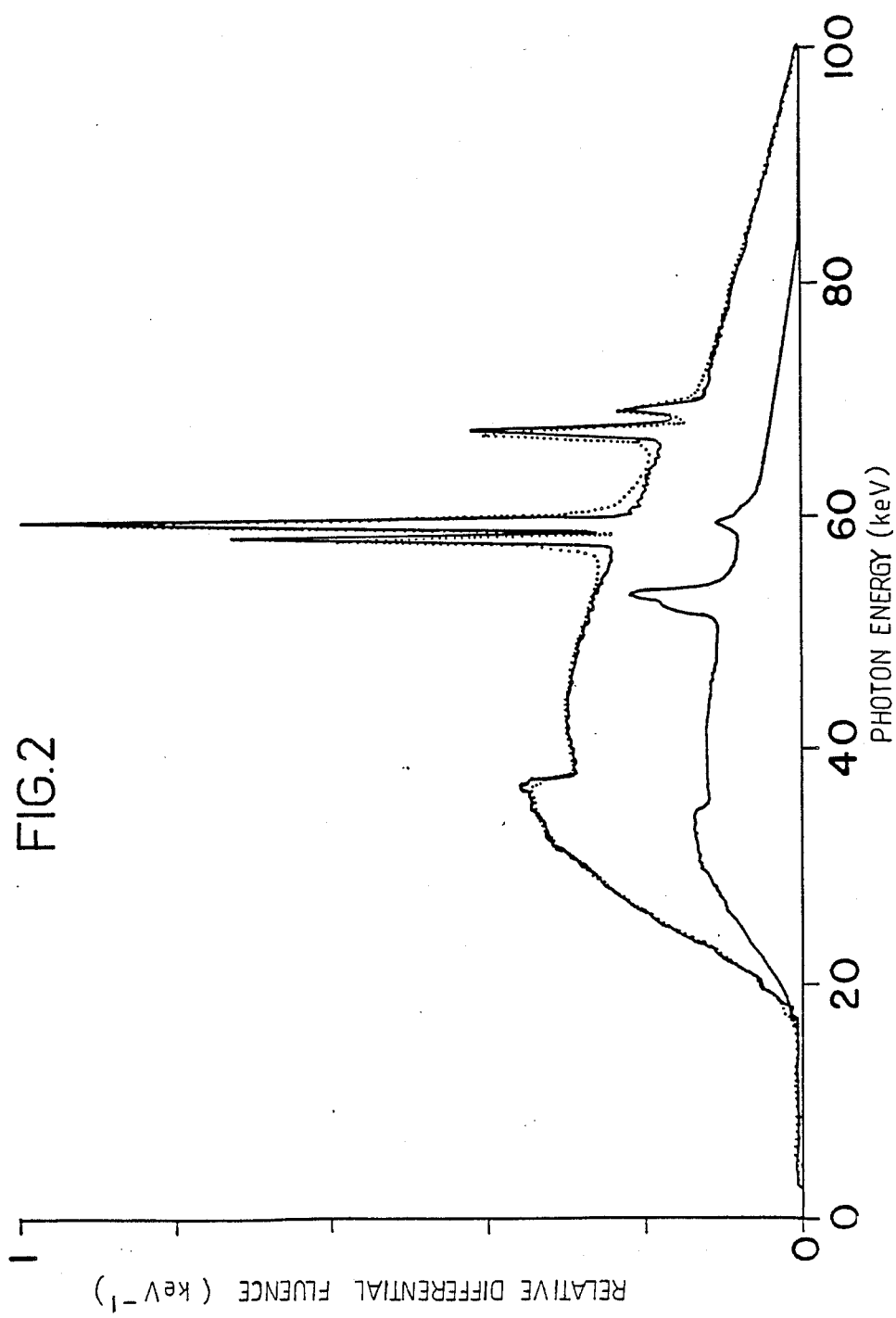
FIG. 2 shows a plurality of radiation curves wherein the relative differential fluence is plotted as a function of photon energy.

$\phi_{1,h\nu}$ in equation (E4) is only used for reconstruction on and around the peaks. FIG. 2, dotted curve, shows the total result when the equations (E1) and E4) are combined. As is apparent, the reconstruction is very good. The difference between the continuous and dotted lines is very small.

Figure 1:
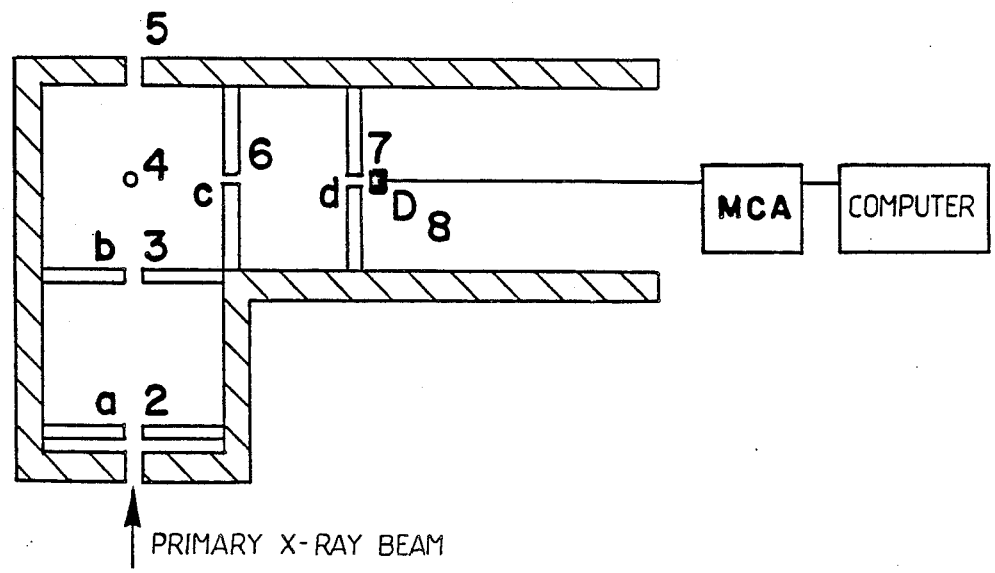
FIG. 1 is a schematic view of a scattering chamber according to the invention.

A practical illustrative example of the invention is apparent from the following description. FIG. 1 shows schematically a scattering chamber according to the invention and FIG. 2 shows the radiation curves already treated. The scattering chamber shown in FIG. 1 is substantially angular. In the first angle arm there is an aperture for incident, highly intensive x-radiation. Within the chamber there are a first collimator 2 and a second collimator 3 defining the radiation which thereafter hits the filament 4. The radiation passing the filament and past it passes out through an aperture 5 on the other side of the scattering chamber. At right angles to the direction of radiation through the collimators and the filament two collimators 6 and 7 are arranged and the radiation scattered in the filament passes through the collimators to a detector 8 in the other arm of the scattering chamber. In this case the detector is a High parity Ge-detector connected to a multichannel analyzer. This, in turn, is connected to a data processing unit reconstructing spectra according to the equations (E1)-(E4). a-c are collimators of the dimensions 3 mm×25 mm. d is a collimator of the diameter 3 mm. D is the Ge-detector. O is the scatterer. The drawing is made almost on a correct scale. It is apparent from this that the chamber can easily be used on place in most existing x-ray equipments. The material of the filament is polyethylene, lucite or another material of a low average atomic number providing rapid and precise reconstructions. In the example shown air scattering corresponds to a very small portion of the totally detected intensity.

In the practical embodiment of the invention our calculation algorithms are preferably implemented in a computer so that a handy measuring instrument is obtained.

We claim:

1. A method for measuring high energy electromagnetic radiation by means of scattering, characterized in that a scatterer in the form of a long and narrow filament or a long and narrow rod is placed in the beam path of the high-energy radiation and the spectrum of the scattered radiation is measured at an angle to the original beam path and the original spectrum is thereafter reconstructed, from the measured spectrum.

2. The method of claim 1, characterized in that a material having a low average atomic number is used as scatterer.

3. The method of claim 1, characterized in that the scattered radiation is measured at a selected and well defined angle to the incoming radiation.

4. The method of claim 2, characterized in that the scattered radiation is measured at a selected and well defined angle to the incoming radiation.

5. The method of claim 1, characterized in that the method further comprises the step of defining at least one of said beam path and said scattered radiation with at least one collimator.

6. The method of claim 2, characterized in that the method further comprises the step of defining at least one of said beam path and said scattered radiation with at least one collimator.

7. The method of claim 1, characterized in that the method further comprises the step of defining at least one of said beam path and said scattered radiation with at least one collimator.

8. A device for use in measuring a high-energy electromagnetic radiation beam traveling along a path by means of Compton scattering, comprising:
   a chamber enclosing at least a portion of said beam;
   a scattering element disposed in the beam path, so as to scatter the beam, including at least one of said filament and said rod, having a length substantially greater than its cross-sectional dimensions at a point where the beam is scattered toward a detector;
   a detector arranged in the same plane with the radiation beam and a cross-section of the scattering element and disposed at an angle to the beam path to measure radiation scattered by said scattering element; and
   said scattering element having a longitudinal axis extending generally perpendicular to said plane and having a cross-section in the plane of dimensions substantially less than the length of the scattering element so as to scatter a portion of the beam toward the detector, the scattered portion having a spectrum indicative of the spectrum of the radiation beam, whereby the spectrum of the beam may be reconstructed from the spectrum of the scattered radiation.

9. The device of claim 8 characterized in that said filament and said rod are made from a material having a low average atomic number.

10. The device of claim 8 wherein said detector is disposed at an angle of 90° relative to the radiation beam.

11. The device of claim 9 wherein said detector is disposed at an angle of 90° relative to the radiation beam.

12. The device of claim 8 wherein said at least one of said filament and said rod is generally cylindrical, having a circular cross-section.

13. The device of claim 9 wherein said at least one of said filament and said rod is generally cylindrical, having a circular cross-section.

14. The device of claim 10 wherein said at least one of said filament and said rod is generally cylindrical, having a circular cross-section.

* * * * *

UNITED STATES PATENT AND TRADEMARK OFFICE
CERTIFICATE OF CORRECTION

PATENT NO. : 4,894,543

DATED : January 16, 1990

INVENTOR(S) : Roland Ribberfors and Georg Matscheko

It is certified that error appears in the above-identified patent and that said Letters Patent is hereby corrected as shown below:

In the Abstract, line 4, change the word "lucite" to read --Lucite--.

In the Abstract, line 8, change the numeral "4" to the numeral --3--.

In the Abstract, line 8, change "the" to read --The--.

In Column 1, line 10, change the word "rats" to read --rates--.

In Column 1, line 13, change "is" to the word --are--.

In Column 1, line 15, change the word "are" to the word --is--.

In Column 2, line 18, after the word "materials" delete the semicolon --;--.

In Column 2, line 36, change the numerals "2.83" to read --2.82--.

Signed and Sealed this

Twenty-third Day of April, 1991

Attest:

HARRY F. MANBECK, JR.

Attesting Officer

Commissioner of Patents and Trademarks